Patented Nov. 12, 1940

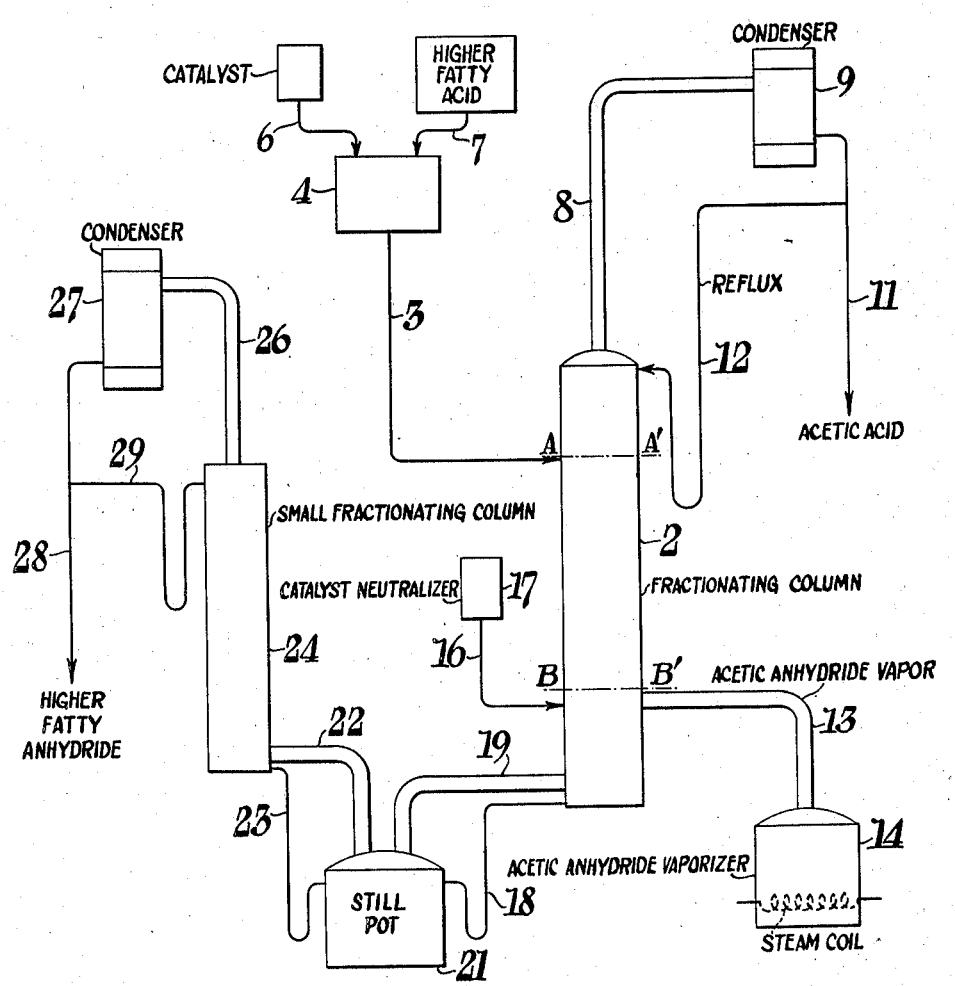

2,221,026

UNITED STATES PATENT OFFICE 2,221,026

MANUFACTURE OF ANHYDRIDES OF HIGHER FATTY ACIDS

Carl J. Malm and Webster E. Fisher, Rochester, N. Y., assignors to Eastman Kodak Company, Rochester, N. Y., a corporation of New Jersey Application February 10, 1937, Serial No. 125,098

5 Claims. (Cl. 260—546)

This invention relates to the manufacture of the anhydrides of the higher fatty acids and substituted fatty acids. More particularly this invention concerns an improved method of manufacturing anhydrides of aliphatic acids by a procedure constituted improvement over that shown in our U. S. Patent 2,026,985 and the processes of patents referred to therein.

In our patent aforementioned we have described a catalytic method for the manufacture of anhydrides of the higher fatty acids. Since our discovery, other similar processes have been developed and described. These processes in general involve a catalytic reaction and it is with such catalytic processes that our improvement invention is primarily concerned. The use of catalysts in such processes may introduce a number of difficulties. For example, some of the preferred catalysts are acids which may be of a corrosive nature. The circulation of such materials throughout the entire apparatus involves unnecessary corrosion. Furthermore such materials, if finally present in the finished product, may detract somewhat from the usefulness thereof.

We have found a procedure whereby catalytic processes for the production of higher anhydrides and substituted anhydrides of the type under description may be improved, rendered more economical of operation and otherwise rendered more desirable.

This invention has for one object to provide a process for producing anhydrides of the higher fatty acids or substituted fatty acids. Still another object is to provide a catalytic process for the product of the higher anhydrides which is continuous. Another object is to provide a process for producing anhydrides of the higher aliphatic acids which produces improved yields. Still another object is to provide a procedure for producing acid anhydrides whereby increased capacity of operation is obtained from present equipment. A still further object is to provide a process for producing acid anhydrides wherein chemical destruction of equipment is minimized. A still further object is to provide a process for producing anhydrides of the higher fatty acids and the substituted fatty acids whereby in high grade products may be obtained. Other objects will appear hereinafter.

The above objects are accomplished by our novel process set forth in detail herein. We have found that anhydride processes of the type herein may be improved by the use of many catalysts. These catalysts should be present at all points in the apparatus where the reaction forming the higher fatty acid anhydride or substituted anhydride is taking place. However, to have the catalyst present at other points may introduce disadvantages. We have also found that since reactions of the type under consideration, generally between acetic anhydride and a higher acid or substituted acid, is endothermic, it is highly desirable to supply extra heat at the point where the reaction occurs. We have also found that by supplying the extra heat near to the zone of reaction increased apparatus capacity may be obtained.

For a more complete understanding of our invention, reference is made to the attached drawing forming a part of the present application. The attached figure is a semi-diagrammatic side elevation view showing one suitable arrangement of apparatus for carrying out our invention.

In the attached figure, 2 represents a fractionating column of the usual type which may be employed for carrying out the reaction. The upper part of the column is connected by a feed conduit 3 which leads to storage of feed tank 4. These tanks are provided with connection to a source of catalyst as at 6 and higher acid as at 7. While we have shown adding the catalyst at this point, we may add it at other places such as directly to the reaction zone. Also from the upper part of the column an offtake conduit 8 leads to condenser 9. This condenser is provided with draw-off conduit 11 and a reflux conduit 12. It is to be understood that two or more condensers may be employed at 9 and weir boxes or other devices inserted at conduit junctions.

The main column 2 may be considered as constituting zones defined by A—A' and B—B' as will be described further with respect to our process. The lower part of column 2, preferably near or adjacent to the reaction zone, is connected by conduit 13 to the vaporizer or still pot 14. It is to be understood that we contemplate the use of vaporizers and other equipment of the same general type as shown in Gordon U. S. Patents 2,049,440 and 2,049,441. Also provided at the lower portion of the column is another inlet conduit designated 16 which is connected with a source of catalyst neutralizer as at 17. The lower portion of column 2 is connected by conduits 18 and 19 to the base heater or still pot 21 which may be similar to types shown in the aforementioned Gordon patents.

Base heater 21 is also connected to another fractionating column 24 by means of conduits 22 and 23. This fractionating column is provided with a vapor off-take 26, condenser 27 and conduits 28 and 29 all of which parts are similar to those connected with the upper portion of column 2 or apparatus such as shown in the various figures of our Patent 2,026,985 may be employed provided satisfactory means for catalyst treatment is attached thereto.

The operation of the above described apparatus as well as a better understanding of our improved process may be had by reference to the following example. This example is set forth primarily for giving our preferred embodiment, hence our invention is not to be construed as limited to the exact elements shown. Referring now to the attached figure, the higher acid, together with the catalyst—which may be any mineral acid for example—is introduced through conduit 3 so that it enters the column at about the plate A—A'. The catalyst is preferably dissolved in the higher acid before being fed to the column. Acetic anhydride is introduced into the column at or adjacent to the reaction zone namely at the point B—B'. The acetic anhydride is in the vapor form and introduced at or about the reaction zone as described because by this means heat necessary to complete the reaction for the formation of the higher anhydride is obtained. As already pointed out, the reaction between acetic anhydride and higher acids is endothermic, hence requires heat at the point where reaction occurs. If this heat is secured by condensation of vapors from the still pot which must pass up the column to the point of reaction, there is a reduction of capacity in the apparatus. By supplying heated vapors substantially to the reaction zone as we have shown, added apparatus capacity is obtained.

At about the same point, namely near or adjacent the reaction zone a catalyst neutralizing agent may be introduced to neutralize or otherwise change the catalyst after it has completed its function in the reaction zone. For example, this agent may be sodium acetate. While the agent may be introduced in various ways we have found that if introduced in solution highly efficient contact may be obtained. For example, in the case of sodium acetate this agent may be dissolved in acetic anhydride and the solution introduced through conduit 16 into the column. Inasmuch as the acetic anhydride necessary to introduce the agent into the column as a solution will only comprise a small part of the total acetic anhydride being employed in the process, such procedure does not detract from our aforementioned procedure of supplying acetic anhydride vapors to the reaction.

Column 2 may be considered as divided into three zones. In the middle zone defined by the lines A—A' and B—B' the reaction between acetic anhydride and the higher acid is carried out. The higher acid and catalyst introduced at A—A' tends to work its way down the column where it meets an ascending stream containing acetic anhydride vapor. The acetic anhydride concentration of this stream progressively increases down to its point of introduction, which in the example under consideration, is at about B—B'. At this point the higher acid will have been substantially completely converted to the higher anhydride. The acetic anhydride introduced at the point B—B' gradually finds its way up the distilling column and through reaction becomes converted to acetic acid. When it reaches the plate A—A' it will have been substantially all converted to acetic acid.

At point A—A', therefore, there will exist only the higher acid and acetic acid, while at the point B—B' there will exist only acetic anhydride and the anhydride of the higher acid. The zone above A—A' may be simply a fractionating zone where acetic acid may be separated from the higher acid by any usual or conventional procedure. In the instance under description we obtain the necessary separation by fractional distillation. Therefore, at the top of the column there will exist only acetic acid which is continuously removed.

The zone below the line B—B' is similarly a fractionating zone where acetic anhydride is separated from the higher anhydride. At the bottom of the column, therefore, there will exist only the higher boiling anhydride which continuously flows back into still pot 21. An additional column is connected with still pot 21 and the higher boiling anhydride is continuously distilled through this column and removed as at 28.

At about the point B—B' in column 2, the catalyst which has run down the column from A—A' may be treated for the neutralization or other conversion thereof. In the example under description, the catalyst was converted by the addition of sodium acetate. That is, in the present example, sulfuric acid was used as a catalyst and by the sodium acetate addition it became converted at about the plate B—B' to sodium acid sulfate. This sodium acid sulfate continued down the column where it built up in concentration in still pot 21 from which it may be cleaned out as desired.

In the foregoing example the higher organic acid introduced at 1 may be any one of a number such as for example propionic or butyric acid in which event propionic or butyric acid anhydride would be obtained at 28. Acids such as stearic acid might be converted to anhydride in which event the acid is preferably introduced in a molten condition as described in our companion Patent 2,026,985. The other features such as vacuum distillation of the resulting anhydride also described in our companion patent may be employed. As already indicated any inorganic acid catalyst may be employed such as sulfuric, hydrochloric or phosphoric acid or certain salts may be employed as described in our companion Patent 2,026,985. The particular catalyst-neutralizing agent added at 17 may vary dependent upon the particular catalyst. As already pointed out sodium acetate is quite satisfactory. However, other agents may be used such as, for example sodium propionate $Na_2CO_3$ and potassium acetate.

By our novel process more efficient and economical results are obtained than by other prior art processes. The catalyst is present only during its useful period. The removal or conversion thereof prevents its existing or promoting any reversible reactions which take place in other parts of the apparatus where different temperature conditions prevail. Our novel process permits the use of many and varied types of catalysts. For example, sulfuric acid which if present in all parts of the equipment such as the very highly heated parts might introduce corrosion problems may be readily used in our process. By feeding the anhydride substantially to the reaction zone, in accordance with our preferred procedure, increased capacity is obtained because of the heat being in substantially the most favorable place for absorption by the endothermic reaction. However, if desired liquid feed through 16 may be increased. In place of the acids mentioned we also contemplate the use of halogenated or alkoxy fatty acids. While we have indicated that our process is carried out at atmospheric pressure, other conditions may be employed. For example, reduced pressure is favorable in some instances such as when anhydrides having a very large number of carbon atoms are being produced.

From the preceding it is apparent that our process is susceptible of some modification. Therefore, we do not wish to be restricted in our invention excepting insofar as is necessitated by the prior art and the appended claims.

We claim:

1. A continuous process for the manufacture of propionic anhydride by reaction which is endothermic between acetic anhydride and propionic acid, the reaction being carried out in a column in which there is a zone wherein the acetic anhydride and propionic acid reaction takes place, which comprises heating a mixture consisting of acetic anhydride and propionic acid together in the column, flowing the heated mixture to the reaction zone, supplying further heat to the reaction zone by substantially continuously injecting therein a substantial quantity of hot acetic anhydride vapor generated outside of the column, substantially continuously drawing off reaction mixture containing propionic anhydride and subjecting the reaction mixture to distillation for obtaining the propionic anhydride therefrom.

2. A process for preparing an anhydride of a fatty acid higher than acetic acid, which comprises reacting the fatty acid and acetic anhydride in the presence of sulfuric acid, and thereafter at least partly chemically converting the catalyst to sodium acid sulfate.

3. A continuous process for the manufacture of anhydrides of fatty acids of more than two carbon atoms, by a reaction which is endothermic, between acetic anhydride and said fatty acids, the reaction being carried out in a column in which there is a zone wherein the acetic anhydride and fatty acid reaction takes place, which comprises heating a mixture consisting of acetic anhydride and said fatty acid together in the column, flowing the heated mixture to the reaction zone, supplying extra heat to the reaction zone by substantially continuously injecting therein a substantial quantity of hot acetic anhydride vapors generated outside of the column, substantially continuously drawing off reaction mixture containing the desired anhydride, and subjecting said reaction mixture to distillation wherein the desired anhydride is obtained as a head product.

4. A continuous process for the manufacture of anhydrides of higher fatty acids having more than two carbon atoms, by reaction between acetic anhydride and a fatty acid above acetic acid, said reaction being endothermic and being carried out in a column in which there is a zone wherein reaction between the acetic anhydride and acid takes place, which comprises heating acetic anhydride and said acid together in the column, flowing heated components through the reaction zone, supplying extra heat to the reaction zone by injecting therein hot acetic anhydride vapors generated outside of the column, vaporizing off acetic acid from said column, condensing and returning to the column a portion of this acetic acid, substantially continuously drawing off reaction mixture containing the higher fatty acid anhydride and subjecting said reaction mixture to a distillation whereby the higher fatty acid anhydride is obtained as a head product, said process being further characterized in that the anhydride forming steps are conducted under a reduced pressure.

5. A continuous process for the manufacture of butyric anhydride by reaction which is endothermic between acetic anhydride and butyric acid, the reaction being carried out in a column in which there is a zone wherein the acetic anhydride and butyric acid reaction takes place, which comprises heating a mixture consisting of acetic anhydride and butyric acid together in the column, flowing the heated mixture to the reaction zone, supplying further heat to the reaction zone by substantially continuously injecting therein a substantial quantity of hot acetic anhydride vapor generated outside of the column, substantially continuously drawing off reaction mixture to distillation for obtaining the butyric anhydride therefrom.

6. A process for the manufacture of anhydrides of fatty acids of more than 2 carbon atoms, by reaction between acetic anhydride and said fatty acid, the reaction being carried out in a column in which there is a zone wherein the acetic anhydride and fatty acid reaction takes place, which comprises heating a mixture consisting essentially of acetic anhydride and said fatty acid, any catalyst being present consisting of a strong mineral acid, in the column, permitting the heated mixture to pass to the reaction zone, supplying extra heat to the reaction zone by substantially continuously injecting therein a substantial quantity of hot acetic anhydride vapors generated outside of the column, substantially continuously drawing off reaction mixture containing the desired anhydride and subjecting the reaction mixture to distillation for separating said desired anhydride.

7. A process for the manufacture of anhydrides of fatty acids of 3-4 carbon atoms, by reaction between acetic anhydride and said fatty acid, the reaction being carried out in a unit in which there is a zone wherein the acetic anhydride and fatty acid reaction takes place, which comprises heating together a mixture consisting essentially of acetic anhydride and said 3-4 carbon atom fatty acid, any catalyst being present being selected from the group consisting of sulphuric acid, hydrochloric acid and phosphoric acid, in said unit, permitting the heated mixture to pass to the reaction zone, supplying further heat to the reaction zone by substantially continuously injecting therein a substantial quantity of hot acetic anhydride vapors generated outside of the unit, substantially continuously drawing off the reaction mixture containing the desired anhydride, and subjecting said reaction mixture to distillation for separating the desired anhydride.

8. A process for preparing an anhydride of a fatty acid higher than acetic acid, which comprises reacting the fatty acid and acetic anhydride in the presence of a catalyst selected from the group consisting of sulphuric acid, hydrochloric acid, and phosphoric acid, and thereafter at least partly chemically converting the catalyst to a salt.

CARL J. MALM.
WEBSTER E. FISHER.